US012292934B2

(12) United States Patent
Gani

(10) Patent No.: US 12,292,934 B2
(45) Date of Patent: May 6, 2025

(54) CLASSIFYING DOCUMENTS USING GEOMETRIC INFORMATION

(71) Applicant: Sage Global Services Limited, Newcastle Upon Tyne (GB)

(72) Inventor: Mahbub Gani, London (GB)

(73) Assignee: Sage Global Services Limited, Newcastle (GB)

( * ) Notice: Subject to any disclaimer, the term of this patent is extended or adjusted under 35 U.S.C. 154(b) by 321 days.

(21) Appl. No.: 17/939,809

(22) Filed: Sep. 7, 2022

(65) Prior Publication Data

US 2024/0078270 A1 Mar. 7, 2024

(51) Int. Cl.
*G06F 16/906* (2019.01)
*G06F 16/93* (2019.01)
*G06V 30/414* (2022.01)
*G06V 30/418* (2022.01)

(52) U.S. Cl.
CPC ............ *G06F 16/906* (2019.01); *G06F 16/93* (2019.01); *G06V 30/414* (2022.01); *G06V 30/418* (2022.01)

(58) Field of Classification Search
CPC ..... G06F 16/906; G06F 16/93; G06V 30/418; G06V 30/414
See application file for complete search history.

(56) References Cited

U.S. PATENT DOCUMENTS

| | | | |
|---|---|---|---|
| 9,740,368 B1 * | 8/2017 | Love | G06F 3/04817 |
| 10,769,503 B1 * | 9/2020 | Buhler | G06F 16/56 |
| 11,580,763 B2 * | 2/2023 | Ammar | G06V 30/153 |
| 2002/0029232 A1 * | 3/2002 | Bobrow | G06V 30/418 |
| | | | 514/534 |
| 2005/0100219 A1 * | 5/2005 | Berkner | G06F 16/5854 |
| | | | 707/E17.023 |
| 2010/0027895 A1 * | 2/2010 | Noguchi | G06V 10/764 |
| | | | 382/224 |
| 2010/0070507 A1 * | 3/2010 | Mori | G06F 16/9535 |
| | | | 707/E17.014 |
| 2012/0070091 A1 * | 3/2012 | Saund | G06V 30/412 |
| | | | 382/225 |
| 2016/0034821 A1 * | 2/2016 | Konoshima | G06N 5/01 |
| | | | 706/52 |
| 2017/0068866 A1 * | 3/2017 | Kostyukov | G06V 30/413 |
| 2017/0132866 A1 * | 5/2017 | Kuklinski | G07D 7/2083 |

(Continued)

OTHER PUBLICATIONS

Neelakantan, Arvind et al., "Text and Code Embeddings by Contrastive Pre-Training", Jan. 24, 2022, 13 pages.

(Continued)

*Primary Examiner* — Mark E Hershley
(74) *Attorney, Agent, or Firm* — Raubvogel Law Office

(57) ABSTRACT

An invoice or other document is automatically classified, for example to identify a vendor or other entity associated with the document, based on geometric characteristics of the document. Geometric information extracted from incoming images of documents is used to reconstruct a unique template, thereby providing a mechanism for automatically classifying newly received documents, for example to determine which vendor is their source. The template for a target document is expressed as a feature vector, which can then be compared with feature vectors previously generated for reference documents, to provide a basis for determining similarity between the target document and various reference documents.

27 Claims, 10 Drawing Sheets

(56) References Cited

U.S. PATENT DOCUMENTS

| | | | |
|---|---|---|---|
| 2019/0294874 A1* | 9/2019 | Orlov | G06N 3/084 |
| 2020/0065576 A1* | 2/2020 | Padmanaban | G06V 30/412 |
| 2020/0193552 A1* | 6/2020 | Turkelson | G06F 18/24143 |
| 2020/0302016 A1* | 9/2020 | Aggarwal | G06V 30/414 |
| 2021/0004589 A1* | 1/2021 | Turkelson | G06V 30/19173 |
| 2021/0240975 A1* | 8/2021 | Sundell | G06V 30/18057 |
| 2022/0067365 A1* | 3/2022 | Agrawal | G06F 40/289 |
| 2022/0156300 A1* | 5/2022 | Paruchuri | G06V 10/82 |
| 2022/0327851 A1* | 10/2022 | Flagg | G06V 30/418 |
| 2023/0028992 A1* | 1/2023 | Zagaynov | G06T 5/30 |
| 2023/0125696 A1* | 4/2023 | Khamkar | G06V 30/418 705/7.14 |
| 2023/0138491 A1* | 5/2023 | Semenov | G06F 40/174 382/176 |
| 2023/0206670 A1* | 6/2023 | Cui | G06V 10/454 382/156 |
| 2023/0230408 A1* | 7/2023 | Arroyo | G06V 10/82 382/156 |
| 2023/0245485 A1* | 8/2023 | Rimchala | G06V 30/413 382/176 |

OTHER PUBLICATIONS

Dua, Sumit, "Text Classification using K Nearest Neighbors", Towards Data Science, Nov. 13, 2018, 17 pages.

Panagopoulos, Dimitris, "Detecting Credit Card Fraud with Autoencoders in Python", Towards Data Science, Apr. 18, 2020, 15 pages.

Shakya, Ashin, "Text Classification: Using K Nearest Neighbors", May 15, 2020, 12 pages.

Palm, Rasmus Berg et al., "CloudScan—A configuration-free invoice analysis system using recurrent neural networks", 2017 14th IAPR International Conference on Document Analysis and Recognition, pp. 406-413.

Rusinol, Marcal et al., "Field Extraction from Administrative Documents by Incremental Structural Templates", 2013 12th International Conference on Document Analysis and Recognition, pp. 1100-1104.

Sun, Yingyi et al., "Template Matching-Based Method for Intelligent Invoice Information Identification", IEEE Access, 2019, pp. 28392-28401.

* cited by examiner

510

```
[{'text_angle': 1.2454,
  'width': 8.5,
  'height': 11.0,
  'unit': 'inch',
  'lines': [{'text': 'Argyle Water',
    'bounding_box': [[1.2177, 0.2435], [2.7362, 0.5252]],
    'words': [{'text': 'Argyle',
      'bounding_box': [[1.2177, 0.253], [1.9674, 0.5252]],
      'confidence': 0.766},
     {'text': 'Water',
      'bounding_box': [[2.0152, 0.253], [2.7267, 0.5156]],
      'confidence': 0.99}],
    'appearance': {'style_name': 'other', 'style_confidence': 0.821}},
   {'text': 'YOUR MONTHLY STATEMENT',
    'bounding_box': [[4.7084, 0.2817], [7.311, 0.5204]],
    'words': [{'text': 'YOUR',
      'bounding_box': [[4.7132, 0.2817], [5.1716, 0.4679]],
      'confidence': 0.994},
     {'text': 'MONTHLY',
      'bounding_box': [[5.2337, 0.296], [6.1315, 0.4918]],
      'confidence': 0.994},
     {'text': 'STATEMENT',
      'bounding_box': [[6.184, 0.3247], [7.2966, 0.5204]],
      'confidence': 0.994}],
    'appearance': {'style_name': 'other', 'style_confidence': 0.878}},
   {'text': 'SUPPLY CORP.',
    'bounding_box': [[1.7573, 0.5299], [2.7362, 0.697]],
    'words': [{'text': 'SUPPLY',
      'bounding_box': [[1.7621, 0.5347], [2.2492, 0.6827]],
      'confidence': 0.994},
     {'text': 'CORP.',
      'bounding_box': [[2.3112, 0.549], [2.741, 0.697]],
      'confidence': 0.996}],
    'appearance': {'style_name': 'other', 'style_confidence': 0.878}},
   {'text': 'Account Number',
    'bounding_box': [[4.8899, 0.5252], [5.9022, 0.6684]],
    'words': [{'text': 'Account',
      'bounding_box': [[4.8947, 0.5252], [5.3865, 0.6589]],
      'confidence': 0.994},
```

FIG. 5B

CLASSIFYING DOCUMENTS USING GEOMETRIC INFORMATION

TECHNICAL FIELD

The present document relates to techniques for automatically classifying documents.

BACKGROUND

An important component of software applications such as accounting applications is the entry of documents that arrive from external sources, such as invoices, statements, and/or the like.

Conventionally, when invoices and/or other documents arrive at a company, they must be entered into accounting software for payment and/or other processing. Such operations may take place by manual entry, or by optical character recognition of text contained in the incoming invoices and/or other documents. Often, invoices and/or other documents must be manually associated with particular vendors or other entities. Such manual operations can be tedious, time-consuming, and error prone.

More specifically, in the context of accounting software, reliable vendor identification is critical so as to ensure that transactions are correctly encoded and recorded in a general ledger. In general, existing optical character recognition (OCR) technology does a poor job of extracting vendor names, and often results in errors.

In addition, conventional deep learning based tools often require large volumes of annotated training data before they are able to deliver adequate performance in classifying documents.

SUMMARY

Various embodiments described herein offer improved functionality for automatically classifying an invoice or other document, for example to identify a vendor or other entity associated with the document, based on geometric characteristics of the document and avoiding the need to perform optical character recognition.

Many vendors use a standard document template for invoices and/or other documents that may be generated by their accounting software or other source. Often, the standard document template has some geometric characteristics that are unique to that vendor. According to the techniques described herein, geometric information extracted from incoming images of documents can be used to reconstruct a unique vendor template, thereby providing a mechanism for automatically identifying particular vendors when new documents are received. As described herein, such techniques can be used for classifying any type of document.

The geometric information may be extracted from information that is implicitly included in features extracted by conventional tools used to process images. Often, such information that could otherwise be leveraged to extract a common invariant for each vendor is contaminated by noise (for example, in the form of individual line items) that results in a departure from the underlying template.

Therefore, various techniques described herein provide mechanisms for extracting geometric features that can be used as the basis for constructing a template sufficient to uniquely determine a vendor (or to otherwise classify a document), while also ensuring adequate immunity to corruption of the original template arising from line items and other forms of noise.

The vendor template for a target document is expressed as a feature vector, which can then be compared with feature vectors previously generated for reference documents, to provide a basis for determining similarity between the target document and various reference documents.

The described methodology represents a significant improvement in the accuracy as compared to the output generated by conventional OCR methods. In addition, the described methodology can generate good quality vendor recommendations with relatively low volumes of training instances.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 5A through 5F depict an example of the method of performing geometric analysis of a document to generating a feature vector, according to one embodiment.

DETAILED DESCRIPTION OF THE EMBODIMENTS

Figure 1:
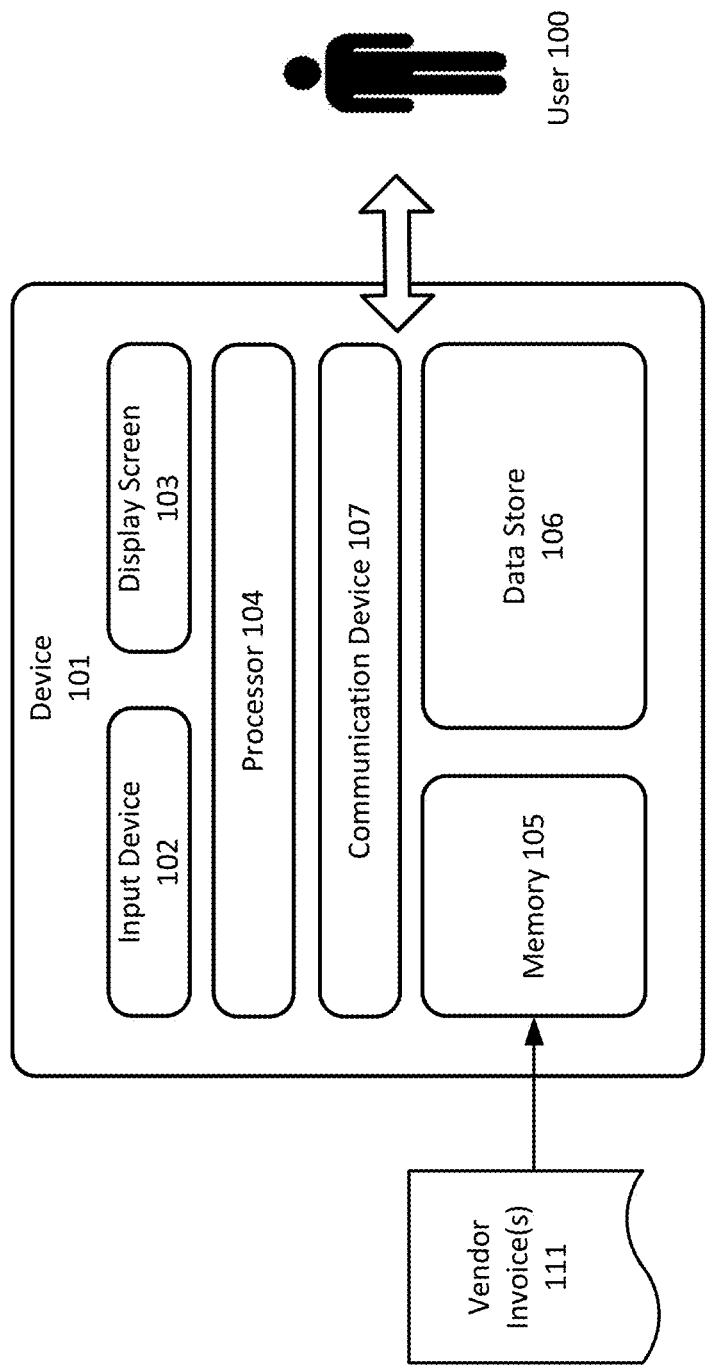
FIG. 1 is a block diagram depicting a hardware architecture for implementing the techniques described herein according to one embodiment.

The systems and methods set forth herein may be applied in many contexts in which it can be useful to classify or categorize incoming documents, for example to associate them with a particular company or other entity. Such techniques can be useful in efforts to automate financial and accounting processes, since many financial transactions use documents. Accordingly, one context for the techniques presented herein is to assist in automating a document extraction process for such financial or accounting processes.

In various embodiments, the techniques described herein can be implemented in cloud-based accounting software, for example, to automatically identify a vendor associated with an incoming invoice or other document. Once the vendor is known, the system can apply related rules and business logic to automate classification and payments based on the vendor's identity. In addition, identifying the vendor can have a significant effect on the accuracy of the process for other aspects of document extraction, since each vendor may be using a different template and/or document structure. By correctly identifying the vendor associated with an invoice or document, the overall results and accuracy of the accounting system can be improved.

The described techniques can also be used in other contexts, and are not limited to identifying vendors associated with invoices. For example, the described techniques can be applied when classifying or categorizing any type of documents for any purpose, and one skilled in the art will recognize that the described techniques can be used in many other situations as well. In addition, the particular hardware arrangements depicted and described herein are simplified examples for illustrative purposes.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, is an individual, company, business, organization, enterprise, entity, or the like, which may optionally include one or more individuals. In the context of the description herein, such individual, company, business, organization, enterprise, entity, or the like may also be referred to as an "entity" or "customer". A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user. A "document", such as vendor invoice 111, is any electronic or paper document, or an image representing such a document, which may include text and/or numeric information, and which may (but need not) pertain to accounting or business transactions.

For purposes of the description herein, the functionality will be set forth in terms of recognizing, classifying, and categorizing invoices received from vendors. However, such embodiments are merely exemplary; the techniques described herein may be implemented in connection with other documents received from other sources, and the descriptions set forth herein should be considered to apply to any such alternative embodiments and contexts.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data such as vendor invoices 111 and/or other documents received from vendors, companies, and/or other entities. Data store 106 may also store data extracted from vendor invoices 111, including feature vectors and/or other data, for use as described herein in identifying vendors associated with invoices 111.

In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. Metadata associated with configuration data, and defining configuration templates and layers, can be stored in such databases using any suitable data format(s). In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for importing vendor invoices 111, for configuring the automatic categorization and classification of vendor invoices 111, and/or for viewing the output and results of such categorization and classification. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
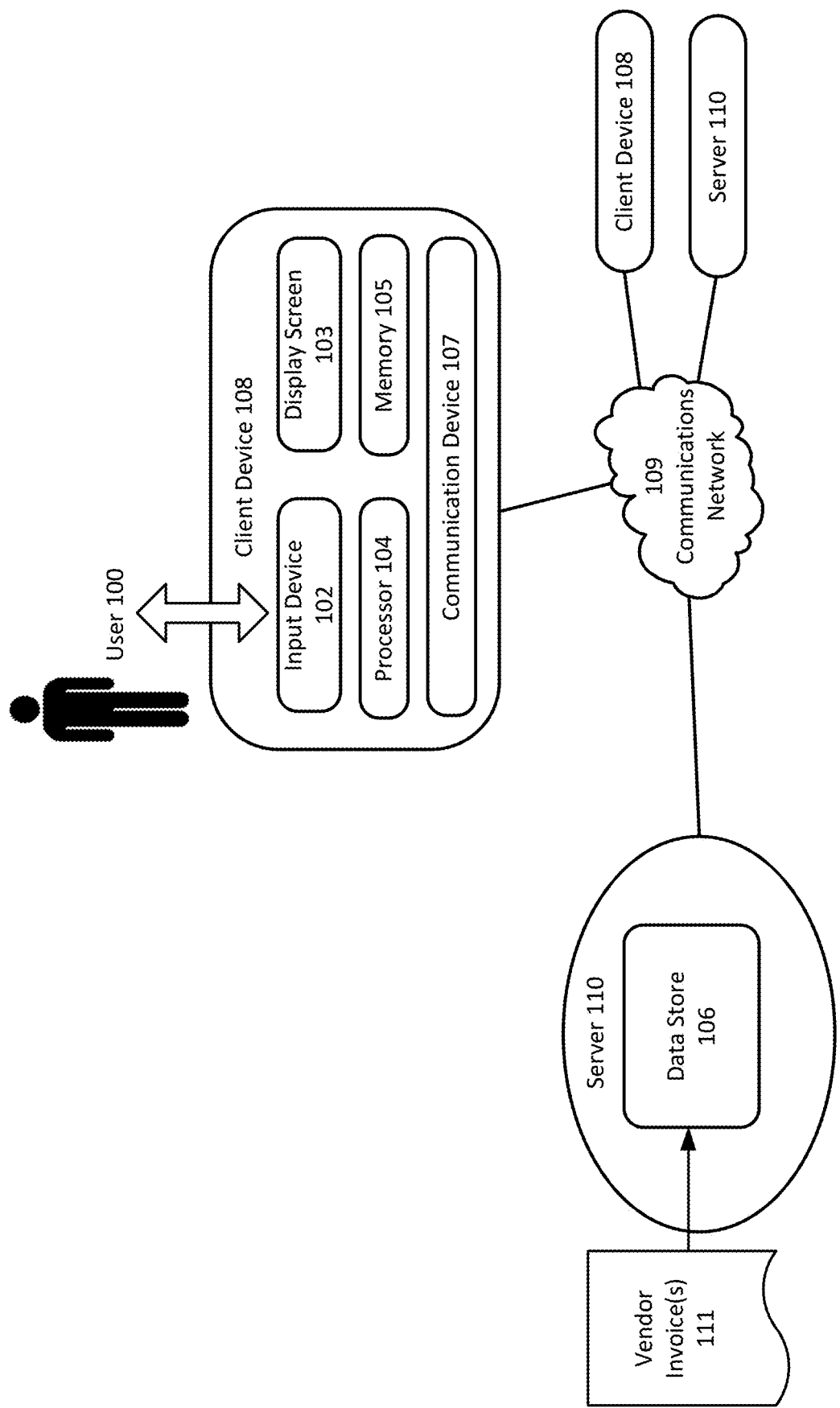
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data such as vendor invoices 111 and/or other documents received from vendors, companies, and/or other entities. In addition, data store 106 may also store data extracted from vendor invoices 111, including feature vectors and/or other data, for use as described herein in identifying vendors associated with invoices 111; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Identifying Vendors

In at least one embodiment, once an invoice or other document is received, the system performs an analysis of geometric features of the document. Such geometric analysis, when combined with text analysis such as term frequency-inverse document frequency (TF-IDF) and the like, provides improved accuracy in identification and classification.

The geometric analysis described herein addresses two challenges:
- how to extract geometric features which can serve as the basis for constructing a template for uniquely identifying a vendor or otherwise classifying a document; and
- how to ensure adequate immunity to corruption of the original template arising from line items and other forms of noise.

Method

In at least one embodiment, the system identifies various rectangular regions within an invoice or other document. Each of the regions may contain text and/or other content. The system constructs a geometric fingerprint associated with invoices for each vendor, using a combination of centroids and areas of the various rectangular regions bounding the textual contents. Once a reference fingerprint has been constructed for each vendor, newly received invoices can be analyzed; fingerprints extracted from the newly received invoices can be compared with the reference fingerprints so as to classify the newly received invoices as being associated with particular vendors. In at least one embodiment, the fingerprints are represented by feature vectors.

Figure 3:
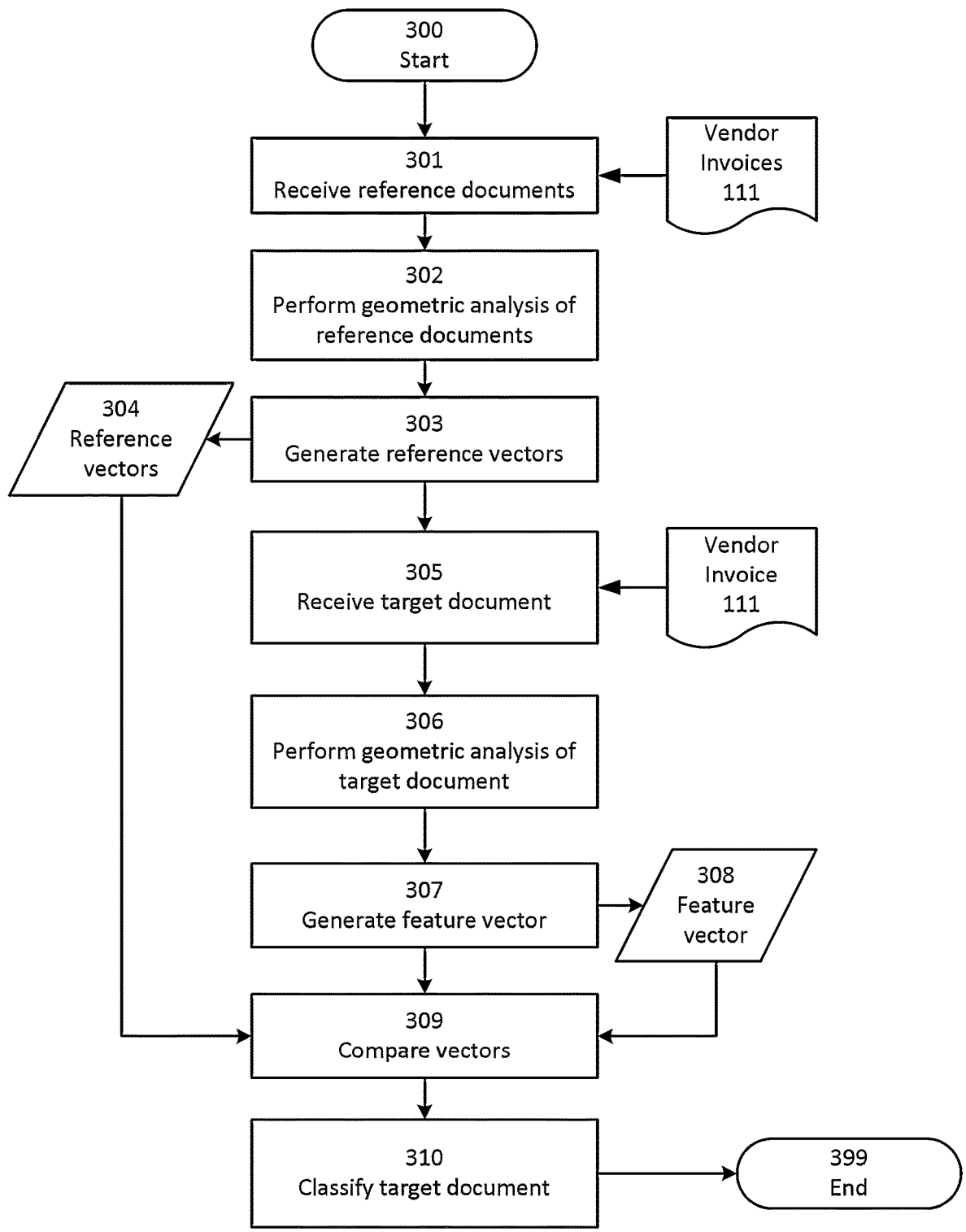
FIG. 3 is a flow diagram depicting an overall method for automatically identifying a vendor associated with an invoice, according to one embodiment.

Referring now to FIG. 3, there is shown a flow diagram depicting an overall method for automatically identifying a vendor associated with an invoice, according to one embodiment. As mentioned above, the depicted method can be used for identifying and/or classifying any type of document(s) and/or source(s), and is not limited to identification of vendors associated with invoices.

In at least one embodiment, the method of FIG. 3 may be performed by software running on a hardware architecture such as that described in connection with FIGS. 1 and/or 2; however, one skilled in the art will recognize that the method of FIG. 3 may be performed using any suitable hardware architecture.

The method begins 300. A number of reference documents (such as vendor invoices 111) are received 301, each associated with a vendor. Using techniques described in more detail herein, the system performs 302 geometric analysis of the reference documents, to generate 303 a set of reference vectors 304, each of which may be a fixed-dimension feature vector. Each reference vector 304 is associated with a particular vendor.

Documents associated with a particular vendor tend to cluster around a localized region within a multi-dimensional feature space. Thus, once the set of reference vectors 304 is generated, the set can be used to automatically identify vendors associated with newly-received documents, as follows.

A new document (also referred to as a "target document") is received 305, such as vendor invoice 111. Using techniques described in more detail herein, the system performs 306 geometric analysis of the target document and generates 307 a feature vector 308 from it. Feature vector 308 is then compared 309 with the set of reference vectors 304, so as to classify it 310, for example by determining which vendor it is most likely associated with. In at least one embodiment, any known nearest neighborhood calculation method can be used to perform steps 309 and 310. The method ends 399.

Figure 4:
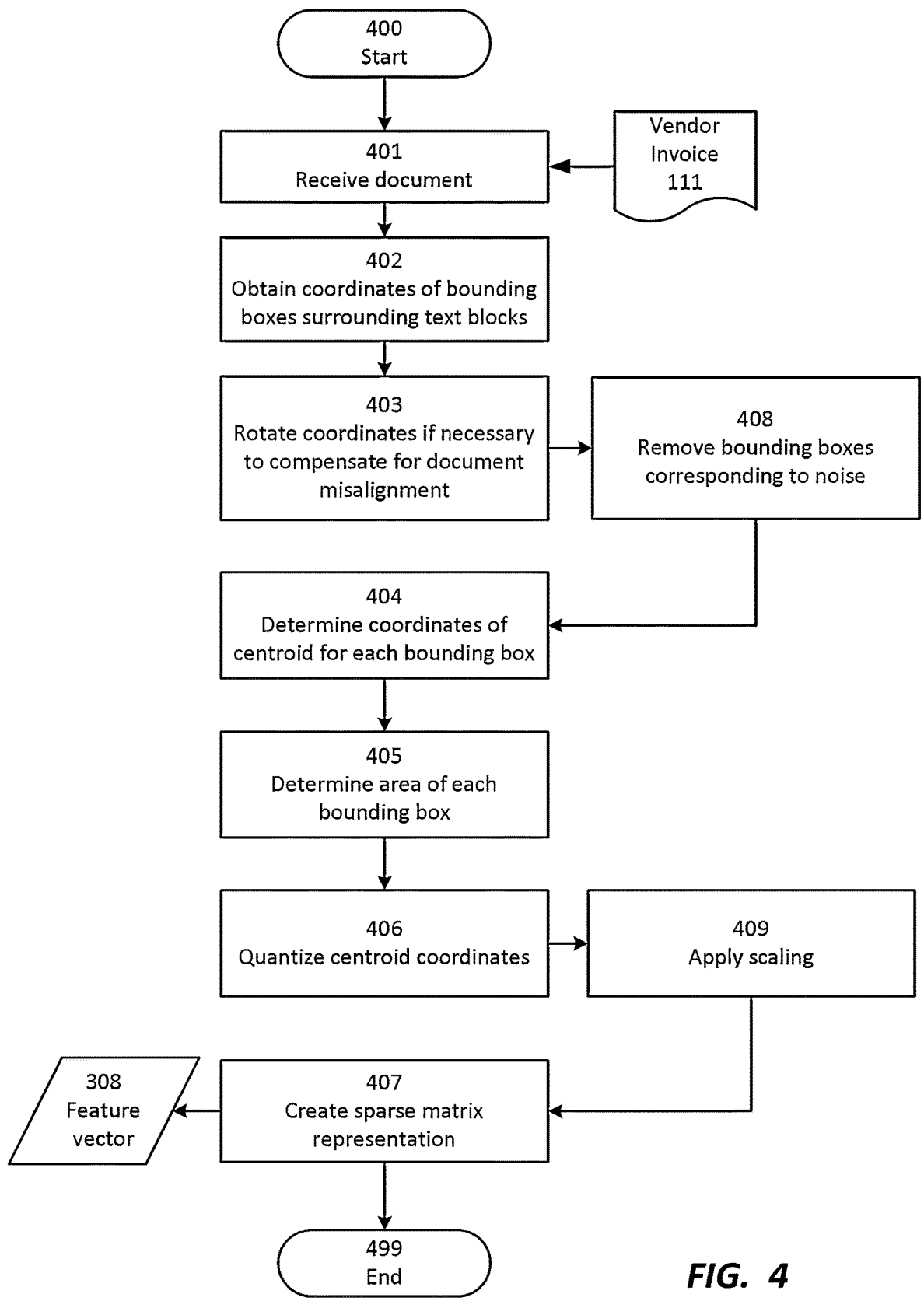
FIG. 4 is a flow diagram depicting further details for performing geometric analysis of a document to generating a feature vector, according to one embodiment.

Referring now to FIG. 4, there is shown a flow diagram depicting further details for performing geometric analysis of a document to generating a feature vector; the method of FIG. 4 can be used to generate reference vectors for documents whose vendors are already known (steps 302 and 303 of FIG. 3), or to generate vectors for newly received documents (target documents) that are yet to be compared with reference vectors so as to identify their vendors (steps 306 and 307 of FIG. 3).

The method begins 400. A document, such as a vendor invoice 111, is scanned or otherwise received 401, for example via email or message, or by being downloaded from a website. The system obtains 402 coordinates of bounding boxes surrounding text blocks. In at least one embodiment, such coordinates can be determined by analyzing results of optical character recognition (OCR) processing performed on the document. Any of a number of third-party tools can be used for obtaining 402 coordinates of bounding boxes, such as those used in OCR functionality that is available from Microsoft Corporation of Redmond, Washington and/or Google, Inc. of Mountain View, California.

In at least one embodiment, if necessary, the system rotates 403 coordinates to compensate for document misalignment during initial image capture.

In at least one embodiment, the system removes 408 bounding boxes corresponding to "noise". For example, if some bounding boxes are determined to not be invariant from one invoice 111 to another for the same vendor, these bounding boxes may be deemed to be noise, and may be removed. The step 408 of removing bounding boxes corresponding to noise is optional. In addition, it may be performed at any suitable point within the method depicted in FIG. 4, such as after steps 403, 404, 405, or 406.

In at least one embodiment, the system ensures that bounding boxes corresponding to individual line items in the invoice document are not considered invariant, so that they are not part of the identifying elements for a particular vendor. Such bounding boxes can be eliminated as noise by, for example, searching for textual content that is expected to vary from one invoice to another, and then removing the bounding box associated with that content. For instance, numerical values appearing in line items can be searched and their bounding boxes excised.

Next, the system determines 404 coordinates of a centroid for each of the extracted bounding boxes, and determines 405 the area of each bounding box.

The system then quantizes 406 the centroid coordinates to a fixed resolution (x,y) coordinate grid. Optionally, the system applies scaling 409. In at least one embodiment, the value used for scaling 409 is a tuning parameter that can be optimized by examining the accuracy performance for different values of the scaling parameter.

The system then creates 407 a sparse matrix representation using the centroid coordinates and corresponding areas determined in steps 404 and 405; this representation is then flattened into feature vector 308. The method ends 499.

Referring now to FIGS. 5A through 5F, there is shown an example of the method of performing geometric analysis of a document to generating a feature vector, according to one embodiment.

Figure 5A:
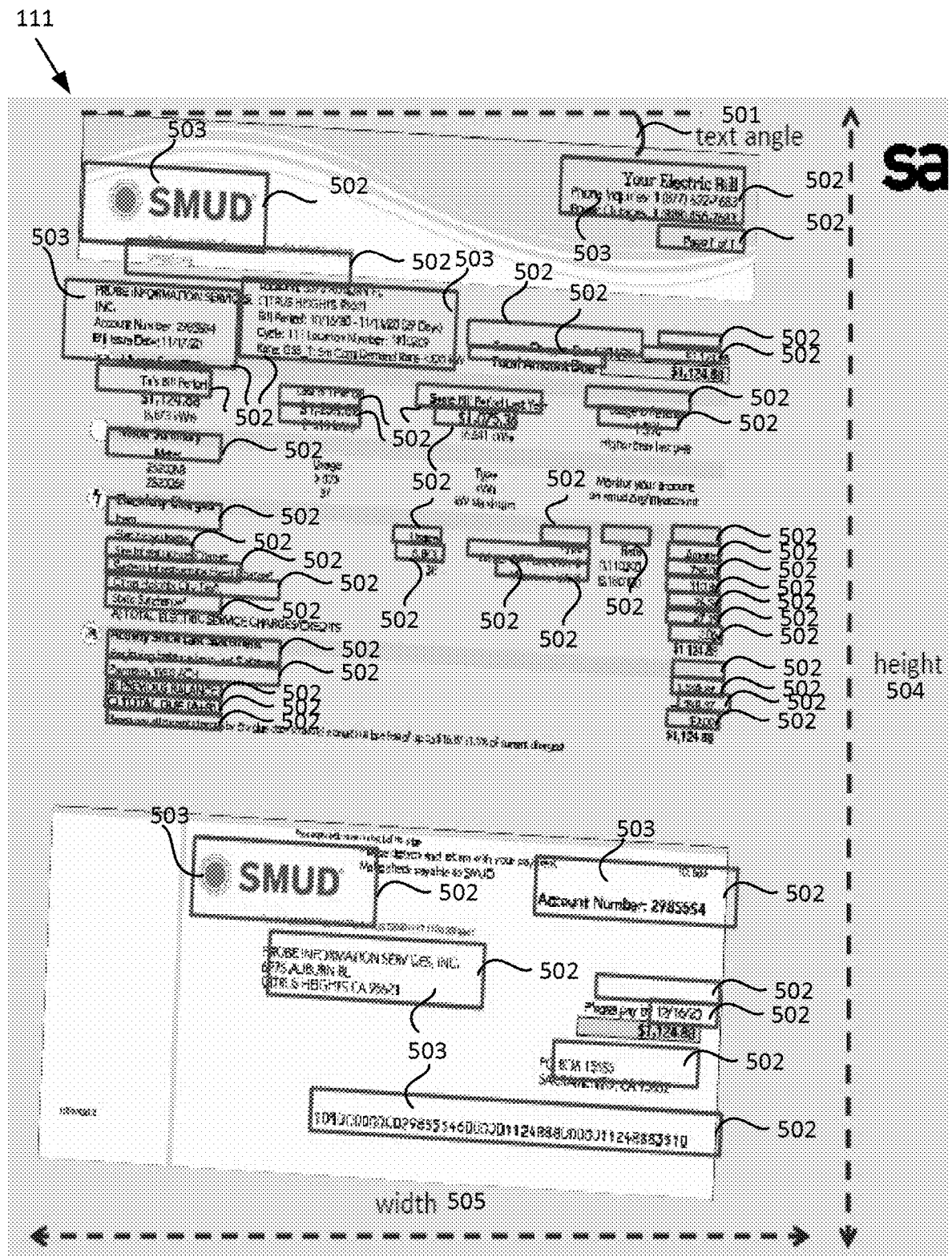

FIG. 5A depicts an example of an original document, which may be received in step 401 of FIG. 4; in this case, the document is a vendor invoice 111. Invoice 111 has a height 504 and width 505 as shown. Bounding boxes 502 are also depicted, surrounding various items 503 such as text blocks, numeric information, line times, graphic elements, and/or the like. Bounding boxes 502 do not actually appear within invoice 111; they are merely included for illustrative purposes. As described above in connection with step 402 of FIG. 4, bounding boxes 502 may be determined using any known OCR technology.

Notably, the particular arrangement of bounding boxes 502 as shown in FIG. 5A is likely to be somewhat consistent from one invoice to another for a given vendor. The techniques described herein provide mechanisms for exploiting this consistency in order to automatically identify a vendor for an invoice 111 based on positioning of detected bounding boxes 502. More specifically, the described techniques allow for vendor identification based on the fact that each vendor can be characterized by a geometric invariant corresponding to a notional invoice template.

In the present example, invoice 111 has been scanned at an angle 501. As mentioned above, this misalignment of the input document can be corrected automatically in step 403 of FIG. 4, by rotating the coordinates to compensate accordingly.

FIG. 5B depicts an example of OCR output 510 for scanned invoice 111. In at least one embodiment, bounding boxes 502 as shown by example in FIG. 5A are based on such OCR output 510.

Figure 5C:
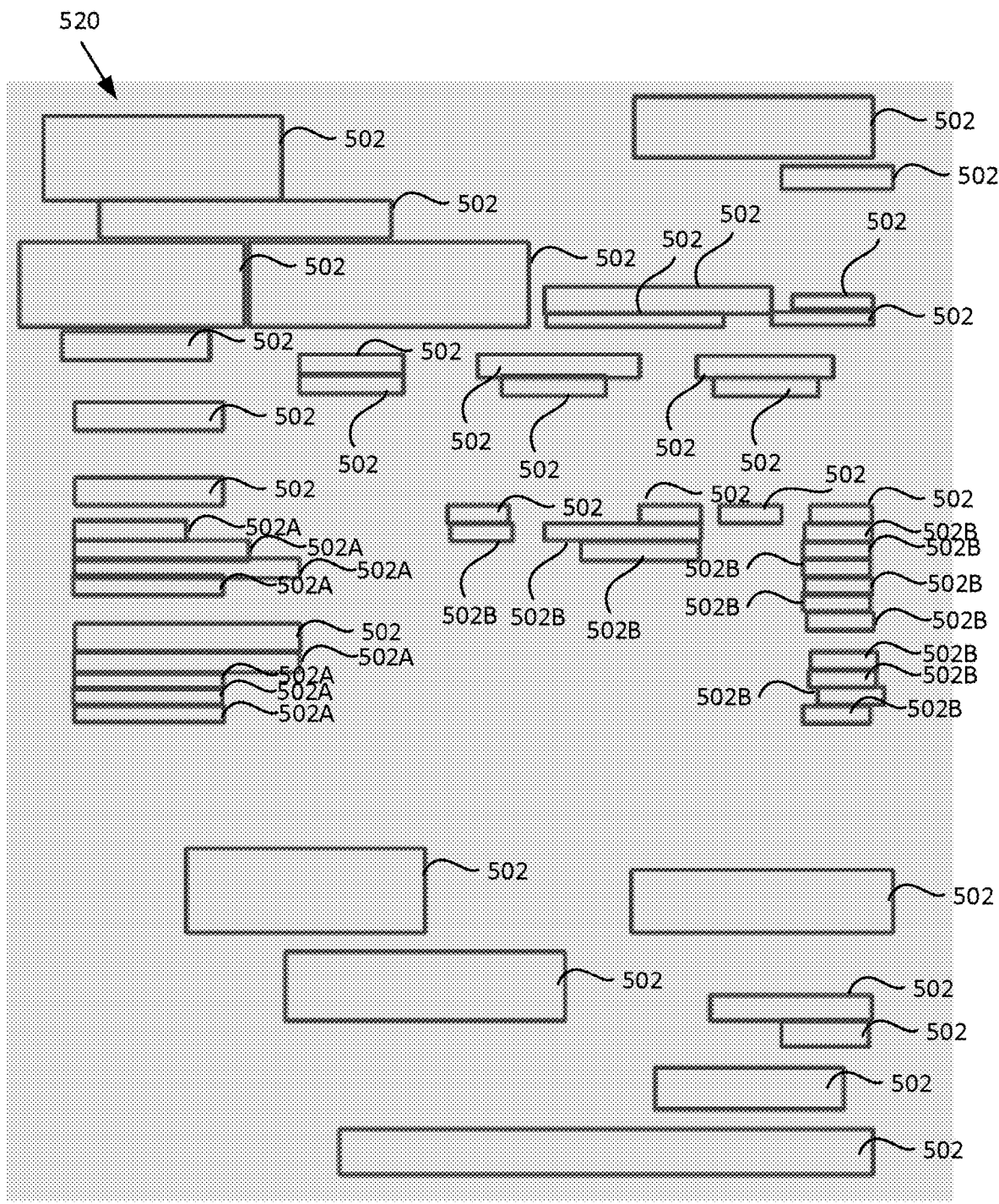

FIG. 5C depicts an initial invoice template 520 extracted from the arrangement of bounding boxes 502 obtained in FIG. 5A. In FIG. 5C, bounding boxes 502 are shown; for clarity, the various text blocks and other items 503 depicted in FIG. 5A are omitted here.

One issue with initial invoice template 520 is that it includes "noise" in the form of some bounding boxes 502 that may not be invariant from one invoice 111 to another. For example, bounding boxes 502A, 502B corresponding to individual line items in invoice 111 represent noise, since different invoices 111 from the same vendor may have different numbers of line items, and therefore would have inconsistent numbers and placements of bounding boxes 502A, 502B.

Figure 5D:
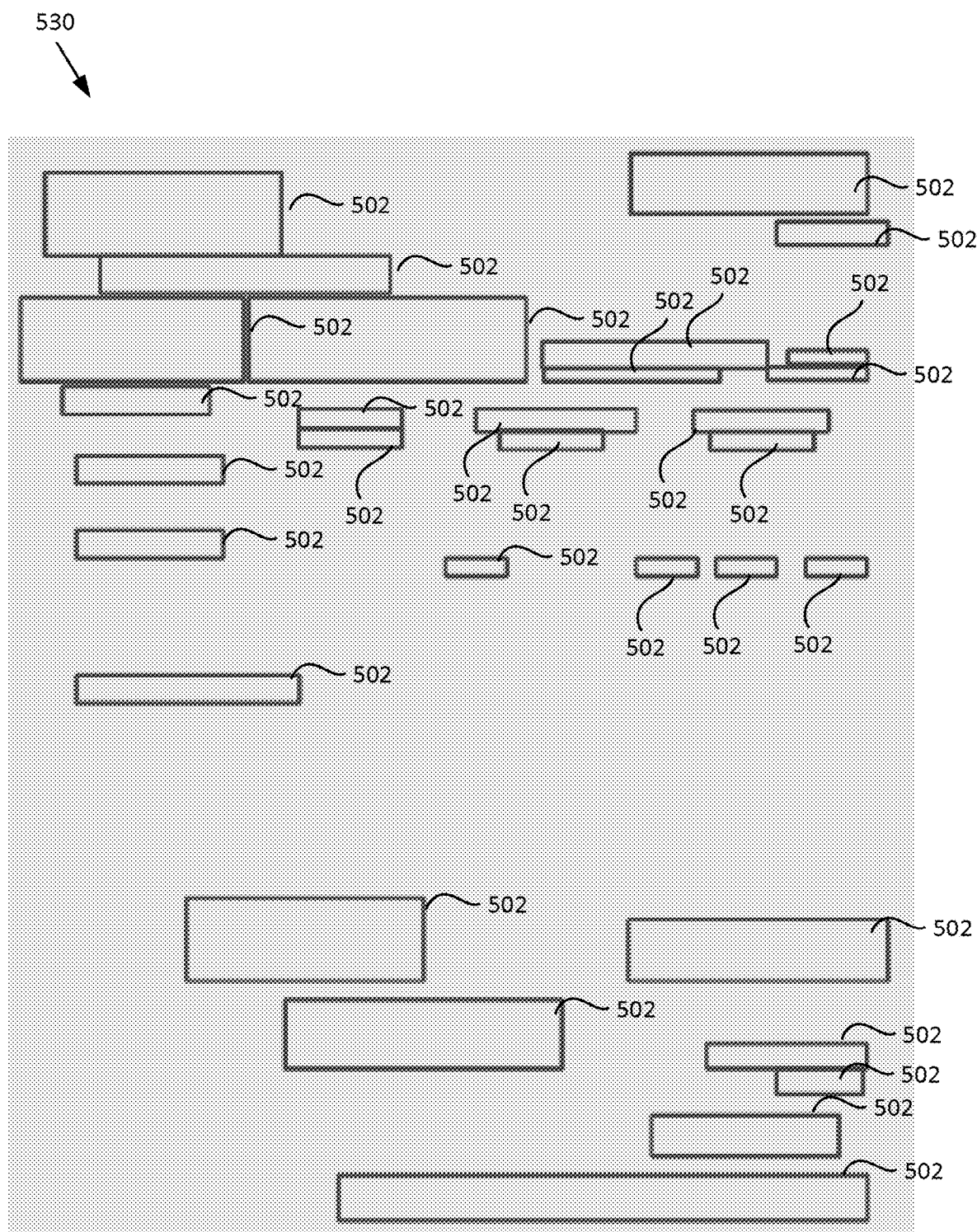

FIG. 5D depicts invoice template 530 after removal of those bounding boxes 502 that correspond to noise (such as bounding boxes 502A, 502B, depicted in FIG. 5C, that corresponding to individual line items), as described above in connection with step 408 of FIG. 4. Thus, invoice template 530 as shown in FIG. 5D corresponds to a geometric invariant that can be used to identify vendors.

Figure 5E:
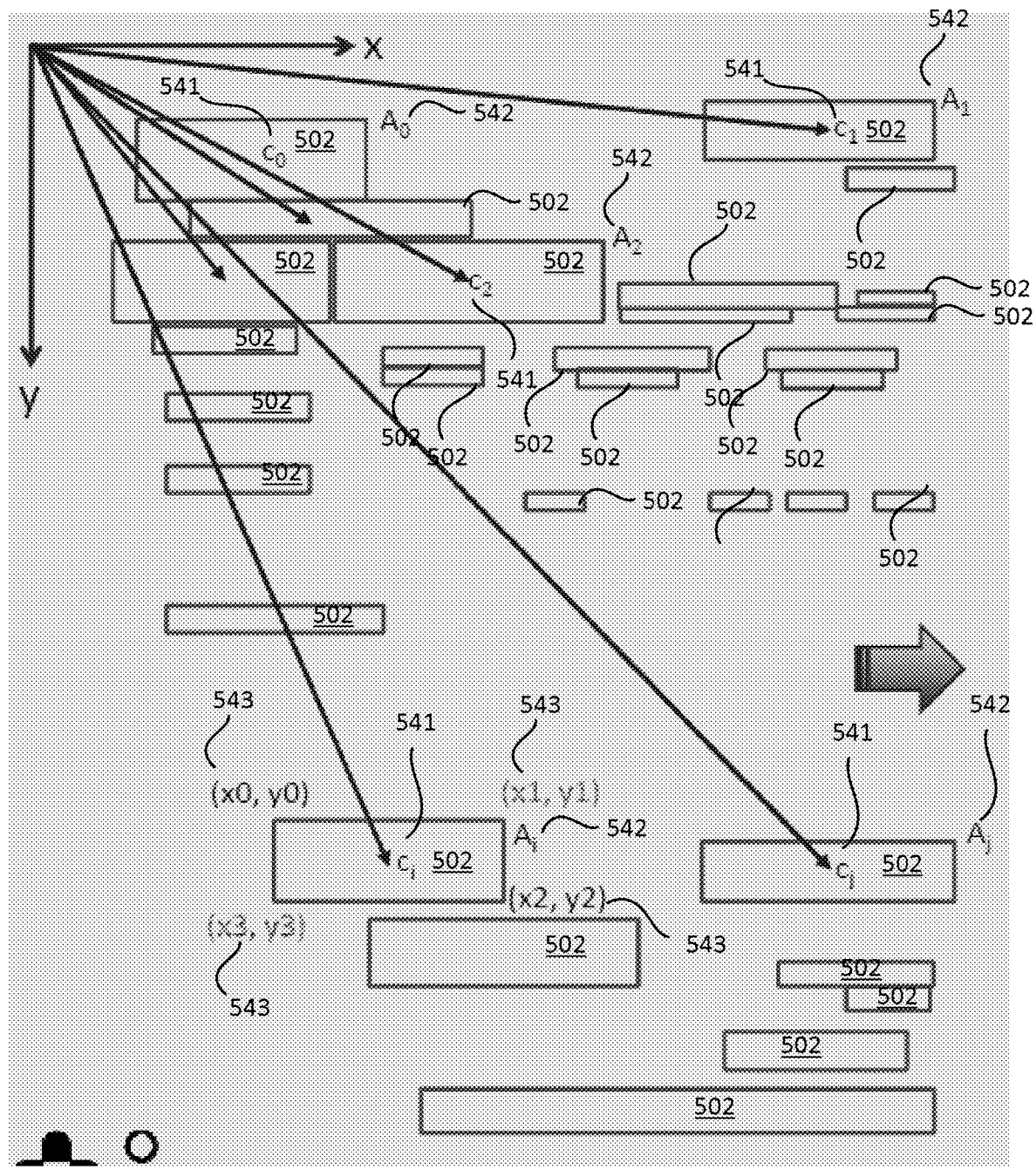

In FIG. 5E, centroid 541 and area 542 are determined for each bounding box 502, as described above in connection with steps 404 and 405 of FIG. 4. In at least one embodiment, these values are determined based on coordinates 543 for the four corners for each bounding box 502. Centroids 541 can be expressed, for example, in terms of (x,y) Cartesian coordinates based on origin 544. The result, as described above in connection with step 406 of FIG. 4, is a list of quantized centroid coordinates 541 and areas 542.

Figure 5F:
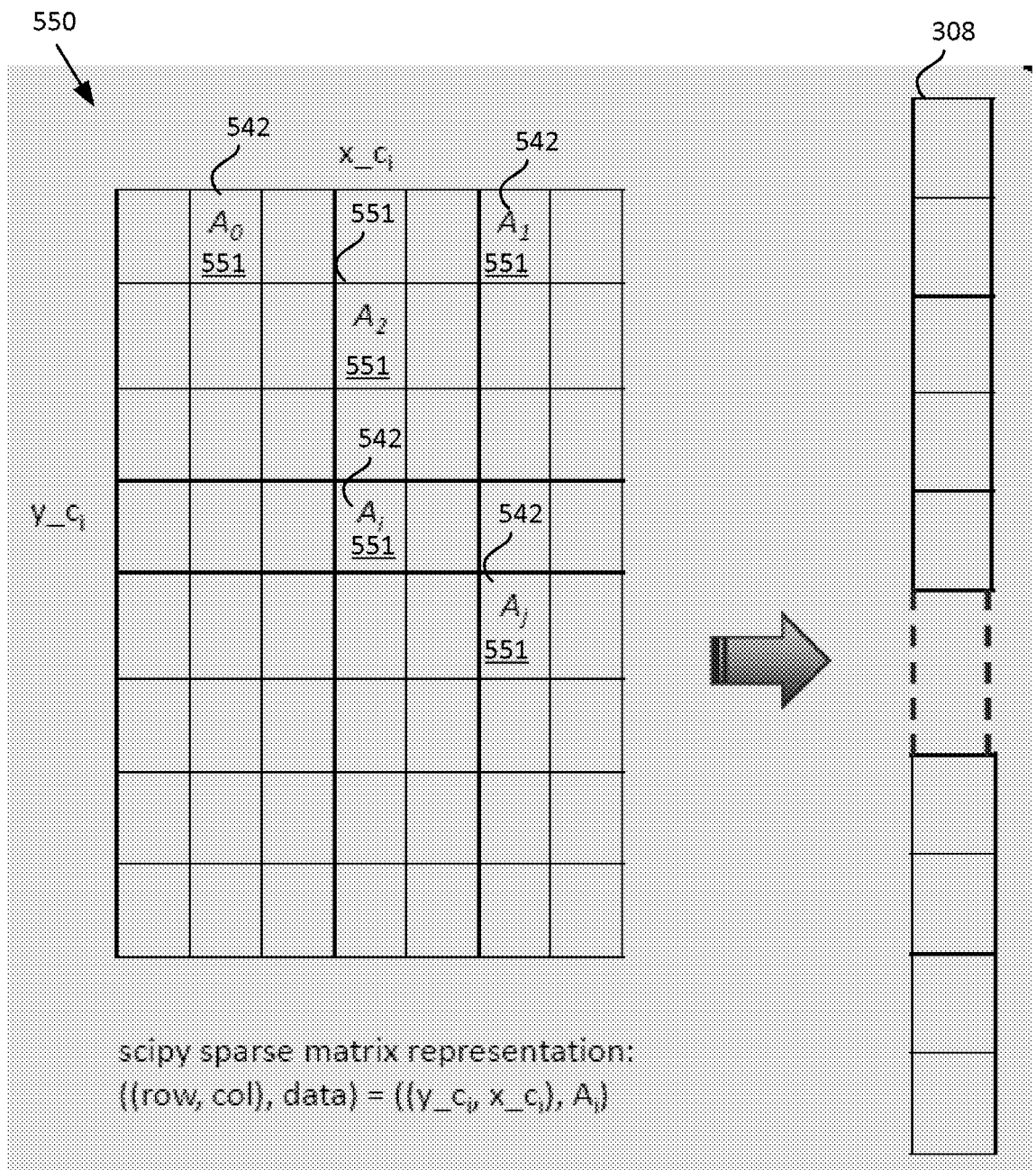

FIG. 5F depicts an example of a SciPy sparse matrix representation 550 of centroids 541 and areas 542 for bounding boxes 502, as generated in step 407 of FIG. 4. Representation 550 includes a number of populated cells 551, each having (x,y) coordinates corresponding to the (x,y) coordinates of a bounding box 502, and having a value corresponding to the area 542 of that bounding box 502. Thus, sparse matrix representation 550 includes cells 551 populated as follows:

$$((\text{row},\text{col}),\text{data}) = ((y\_c_i, x\_c_i), A_i)$$

The use of SciPy allows the data represented by the matrix to be manipulated in a manner that facilitates comparisons of data derived from different invoices 111, so as to enable classification and/or categorization of invoices 111 and thereby identify vendors associated with particular invoices 111.

Sparse matrix representation 550 is flattened into feature vector 308. In at least one embodiment, this operation is performed by using the determined y-coordinate as an index into the row number of the matrix, and the determined x-coordinate as an index into the column number. The matrix is flattened by scanning it row-by-row to generate feature vector 308, wherein the size of vector 308 is the product of the number of rows and the number of columns.

Feature vector 308 is a representation of the original invoice 111 that can now be used by the system to identify vendors associated with invoices 111. Specifically, feature vectors 308 can be compared with one another, using known techniques such as cosine similarity, dot-product arithmetic, and/or nearest-neighbor methodology, to identify those that are proximate to one another in orientation and/or magnitude, so as to assess overall similarity between the underlying documents they represent.

The above-described methodology provides a way to construct feature vectors 308 representing vendor invoice templates, using optical character recognition (OCR) as the mechanism for extracting bounding box information; however, no recognition of textual data or alphanumeric characters themselves is needed. This approach avoids the need to obtain a large number of training samples as do many conventional image recognition methods. In addition, the described technique reduces the dimensionality of feature vectors 308 without impairing overall performance, while reducing the computational cost of automatically determining and classifying vendors associated with invoices.

In at least one embodiment, further advantages can be realized by using approximate methods for performing comparisons between feature vectors 308, so as to automatically ascertain the most likely vendor associated with a particular invoice 111. Such approximations result in computational efficiency gains without a significant impact on performance.

The described technique avoids the need to analyze textual information in invoices 111, and can identify vendors associated with invoices 111 without reference to textual information.

As mentioned above, the described technique can be used in connection with any documents, and is not limited to vendor invoices. Accordingly, the described methods provide a way to determine the source of a document based on layout and/or template, without the need to analyze textual content of the document.

If, after applying the methods described herein, ambiguity exists as to the most likely vendor associated with a particular invoice 111, an alternative method of analysis can be used to remove the ambiguity. For example, at this point, extra-geometrical information such as textual information can be used. In at least one embodiment, an analysis can be performed to determine the number of characters within a text box such as a name/address field; since it is unlikely that multiple vendors with similar templates would also have the same number of characters in their name and/or address, such analysis can be used to resolve the ambiguity, without the need to read the text characters themselves.

As discussed above, the techniques described herein can be used in many other contexts. For example, in at least one embodiment, the described techniques can be used to identify a document type, based on geometric analysis to generate a template for a document type based on arrangements of particular elements. Alternatively, the described techniques can be used to detect fraud (such as vendor fraud), for example by flagging documents that have an unexpected variation in the arrangement of their elements. The geometric analyses used for such applications can be based on the feature vector generation and comparison techniques described herein.

Pseudocode

The following is an example of pseudocode for the method described herein:

```
1. Input: set of N annotated documents from
M vendors, RESOLUTION
    2. Return: feature_vectors for each of the N doc-
uments
    3. Initial-
ize: bounding_box_coords, doc_height, doc_width,
doc_angle,
        bounding_box_centroids, bound-
ing_box_arrays
        ANN_graph
    3. Extract_centroids_and_areas:
    4. while 0 <= n < N do
    5.   bounding_box_coords[n] <- OCRServ-
ice(doc[n])
    6.   doc_height[n], doc_width[n] <- OCRServ-
ice(doc[n])
    7.   doc_angle[n] <- OCRService(doc[n])
    8.   bounding_box_coords[n] <- ro-
tate_coords(bounding_box_coords[n], doc_angle[n])
    9.   bounding_box_centroids[n] <-
get_centroids(bounding_box_coords[n])
    10.  bounding_box_areas[n] <-
get_areas(bounding_box_coords[n])
    11.  n <- n+1
    12. Generate features:
    13. MAX_X_COORD =
float_to_int(get_median_value(doc_width)+0.5)
    14. MAX_Y_COORD =
float_to_int((get_median_value(doc_height)+0.5)
    15. NROWS = RESOLUTION* (MAX_Y_COORD+10)
    16. NCOLS = RESOLUTION* (MAX_X_COORD+10)
    17. Initialize: feature_matrix = sparse_matrix
with dimension (NROWS, NCOLS)
        feature_vectors = array with di-
mension (NROWS*NCOLS)
    18. while 0 <= n < N do
    19.  scaled_centroids[n] <-
float_to_int(RESOLUTION * bounding_box_centroids[n])
    20.  scaled_areas[n] <-
float_to_int((RESOLUTION**2) * bounding_box_areas[n])
    21.  feature_matrix[n] <-
to_sparse_matrix(scaled_areas[n], scaled_centroids[n])
    22.  feature_vectors[n] <- flat-
ten_sparse_matrix(feature_matrix[n])
        n <- n+1
       feature_vectors <- re-
duce_dimensionality(feature_vectors)
        ANN_graph.add_index(feature_vectors)
```

The following external services may be used in connection with the above pseudocode:

OCRService: an external OCR service that returns coordinates of bounding boxes surrounding text;

float_to_int: convert float to integer value;

to_sparse_matrix: generate sparse matrix representation given data values and matrix indices;

flatten_sparse_matrix: flatten sparse matrix into to return a vector;

get_median_value: Compute median for an array of values;

reduce_dimensionality: feature dimension reduction, e.g. by SVD truncation;

ANN_graph: graph based fast, approximate nearest neighborhood API.

The following internal function definitions apply to the above pseudocode:

get_centroids: compute coordinates of centroids for given array of bounding box coordinates;

get_areas: compute areas of bounding boxes for given array of bounding box coordinates;

rotate_coords: rotate coordinates by given angle.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for classifying a document, comprising:
    receiving a plurality of reference documents;
    at a hardware processing device, for each of the reference documents:
        automatically identifying a plurality of bounding boxes, each surrounding a block of content within the reference document; and
        automatically identifying a subset of the bounding boxes for each reference document as representing noise;
    at the hardware processing device, generating a feature vector for each of the reference documents based on the bounding boxes identified in the reference document that are not included in the identified subset representing noise;
storing the generated feature vectors at a storage device;
receiving a target document for classification;
at the hardware processing device:
automatically identifying a plurality of bounding boxes for the target document, each surrounding a block of content within the target document;
automatically identifying a subset of the bounding boxes for the target document as representing noise;
generating a feature vector based on the bounding boxes identified in the target document that are not included in the identified subset representing noise;
comparing the feature vector for the target document with the feature vectors for the reference documents, to determine which reference document feature vector is most closely aligned with the target document feature vector; and
classifying the target document based on the comparing step; and
at an output device, outputting results of the classifying step.

2. The method of claim 1, wherein each block of content comprises a block of text.

3. The method of claim 1, wherein:
identifying each bounding box comprises determining an area for the bounding box and a centroid for the bounding box;
generating a feature vector for each of the reference documents comprises generating a feature vector based on the determined areas and centroids for the bounding boxes identified in the reference document; and
generating a feature vector for the target document comprises generating a feature vector based on the determined areas and centroids for the bounding boxes identified in the target document.

4. The method of claim 3, wherein:
generating a feature vector based on the determined areas and centroids for the bounding boxes identified in each reference document comprises:
generating a sparse matrix representation based on the determined areas and centroids for the bounding boxes identified in the reference document; and
generating the feature vector from the sparse matrix representation; and
generating a feature vector based on the determined areas and centroids for the bounding boxes identified in the target document comprises:
generating a sparse matrix representation based on the determined areas and centroids for the bounding boxes identified in the target document; and
generating the feature vector from the sparse matrix representation.

5. The method of claim 1, wherein:
classifying the target document comprises identifying the source of the target document.

6. The method of claim 1, wherein:
the target document comprises a vendor invoice; and
classifying the target document comprises identifying the vendor associated with the target invoice.

7. The method of claim 1, wherein comparing the feature vector for the target document with the feature vectors for the reference documents comprises performing vector analysis.

8. The method of claim 1, wherein comparing the feature vector for the target document with the feature vectors for the reference documents comprises performing nearest neighbor analysis on the vectors.

9. The method of claim 1, wherein comparing the feature vector for the target document with the feature vectors for the reference documents comprises performing cosine similarity analysis on the vectors.

10. A non-transitory computer-readable medium for classifying a document, comprising instructions stored thereon, that when performed by a hardware processor, perform the steps of:
receiving a plurality of reference documents;
for each of the reference documents:
automatically identifying a plurality of bounding boxes, each surrounding a block of content within the reference document; and
automatically identifying a subset of the bounding boxes for each reference document as representing noise;
generating a feature vector for each of the reference documents based on the bounding boxes identified in the reference document that are not included in the identified subset representing noise;
causing a storage device to store the generated feature vectors;
receiving a target document for classification;
automatically identifying a plurality of bounding boxes for the target document, each surrounding a block of content within the target document;
automatically identifying a subset of the bounding boxes for the target document as representing noise;
generating a feature vector based on the bounding boxes identified in the target document that are not included in the identified subset representing noise;
comparing the feature vector for the target document with the feature vectors for the reference documents, to determine which reference document feature vector is most closely aligned with the target document feature vector; and
classifying the target document based on the comparing step; and
causing an output device to output results of the classifying step.

11. The non-transitory computer-readable medium of claim 10, wherein each block of content comprises a block of text.

12. The non-transitory computer-readable medium of claim 10, wherein:
identifying each bounding box comprises determining an area for the bounding box and a centroid for the bounding box;
generating a feature vector for each of the reference documents comprises generating a feature vector based on the determined areas and centroids for the bounding boxes identified in the reference document; and
generating a feature vector for the target document comprises generating a feature vector based on the determined areas and centroids for the bounding boxes identified in the target document.

13. The non-transitory computer-readable medium of claim 12, wherein:
generating a feature vector based on the determined areas and centroids for the bounding boxes identified in each reference document comprises:
generating a sparse matrix representation based on the determined areas and centroids for the bounding boxes identified in the reference document; and generating the feature vector from the sparse matrix representation; and generating a feature vector based on the determined areas and centroids for the bounding boxes identified in the target document comprises:

generating a sparse matrix representation based on the determined areas and centroids for the bounding boxes identified in the target document; and generating the feature vector from the sparse matrix representation.

14. The non-transitory computer-readable medium of claim 10, wherein:

classifying the target document comprises identifying the source of the target document.

15. The non-transitory computer-readable medium of claim 10, wherein:

the target document comprises a vendor invoice; and classifying the target document comprises identifying the vendor associated with the target invoice.

16. The non-transitory computer-readable medium of claim 10, wherein comparing the feature vector for the target document with the feature vectors for the reference documents comprises performing vector analysis.

17. The non-transitory computer-readable medium of claim 10, wherein comparing the feature vector for the target document with the feature vectors for the reference documents comprises performing nearest neighbor analysis on the vectors.

18. The non-transitory computer-readable medium of claim 10, wherein comparing the feature vector for the target document with the feature vectors for the reference documents comprises performing cosine similarity analysis on the vectors.

19. A system for classifying a document, comprising:

a hardware processing device, configured to:

receive a plurality of reference documents;

for each of the reference documents:

automatically identify a plurality of bounding boxes, each surrounding a block of content within the reference document; and automatically identify a subset of the bounding boxes for each reference document as representing noise;

generate a feature vector for each of the reference documents based on the bounding boxes identified in the reference document that are not included in the identified subset representing noise;

receive a target document for classification;

automatically identify a plurality of bounding boxes for the target document, each surrounding a block of content within the target document;

automatically identify a subset of the bounding boxes for the target document as representing noise;

generate a feature vector based on the bounding boxes identified in the target document that are not included in the identified subset representing noise;

compare the feature vector for the target document with the feature vectors for the reference documents, to determine which reference document feature vector is most closely aligned with the target document feature vector; and classify the target document based on the comparing step;

an electronic storage device, communicatively coupled to the hardware processing device, configured to store the generated feature vectors; and an output device, communicatively coupled to the hardware processing device, configured to output results of the classifying step.

20. The system of claim 19, wherein each block of content comprises a block of text.

21. The system of claim 19, wherein:

identifying each bounding box comprises determining an area for the bounding box and a centroid for the bounding box;

generating a feature vector for each of the reference documents comprises generating a feature vector based on the determined areas and centroids for the bounding boxes identified in the reference document; and generating a feature vector for the target document comprises generating a feature vector based on the determined areas and centroids for the bounding boxes identified in the target document.

22. The system of claim 21, wherein:

generating a feature vector based on the determined areas and centroids for the bounding boxes identified in each reference document comprises:

generating a sparse matrix representation based on the determined areas and centroids for the bounding boxes identified in the reference document; and generating the feature vector from the sparse matrix representation; and generating a feature vector based on the determined areas and centroids for the bounding boxes identified in the target document comprises:

generating a sparse matrix representation based on the determined areas and centroids for the bounding boxes identified in the target document; and generating the feature vector from the sparse matrix representation.

23. The system of claim 19, wherein:

classifying the target document comprises identifying the source of the target document.

24. The system of claim 19, wherein:

the target document comprises a vendor invoice; and classifying the target document comprises identifying the vendor associated with the target invoice.

25. The system of claim 19, wherein comparing the feature vector for the target document with the feature vectors for the reference documents comprises performing vector analysis.

26. The system of claim 19, wherein comparing the feature vector for the target document with the feature vectors for the reference documents comprises performing nearest neighbor analysis on the vectors.

27. The system of claim 19, wherein comparing the feature vector for the target document with the feature vectors for the reference documents comprises performing cosine similarity analysis on the vectors.

\* \* \* \* \*